United States Patent [19]

Müller

[11] Patent Number: 4,604,201
[45] Date of Patent: Aug. 5, 1986

[54] FILTER

[75] Inventor: Hans Müller, Erlenbach, Switzerland

[73] Assignee: Dr. Müller AG, Männedorf, Switzerland

[21] Appl. No.: 289,526

[22] Filed: Aug. 3, 1981

Related U.S. Application Data

[63] Continuation of Ser. No. 097,877, Nov. 27, 1979, abandoned, which is a continuation of Ser. No. 896,437, Apr. 14, 1978, abandoned.

[30] Foreign Application Priority Data

Apr. 28, 1977 [CH] Switzerland .......................... 5259/77
Nov. 15, 1977 [CH] Switzerland .......................... 1390/77

[51] Int. Cl.$^4$ .............................................. B01D 23/00
[52] U.S. Cl. .................................................. 210/323.2
[58] Field of Search ................... 210/652, 321.1, 321.2, 210/323.2, 356, 359, 398, 409–412, 437, 483, 496, 500.2, DIG. 5; 55/158, 379

[56] References Cited

U.S. PATENT DOCUMENTS 1,734,325  11/1929  Cannon ............................ 210/356 X
2,657,808  11/1953  Mankin ........................ 210/323.2 X

FOREIGN PATENT DOCUMENTS 1089753  11/1967  United Kingdom ............. 210/323.2

Primary Examiner—Ferris H. Lander
Attorney, Agent, or Firm—Michael J. Striker

[57] ABSTRACT

A filter is provided with a number of elongated filter elements disposed in a pressure vessel. Each element has a filter web extending about the length of the element and fastened at the top and the bottom. Rigid support means are provided inside the filter element in order to support the web. They extend about the length of the element and preferably extend over a part only of the circumference of the element so as to permit the web to perform a limited movement outwards and inwards in radial direction. During the operation the web is pressed against the support means by the inflowing liquid permitting a filter cake to build up at its outside while upon a backwash operation the web moves outwardly away from said support means thus loosening the filter cake. Inlet and outlet means are provided on the pressure vessel. This permits a build-up and easy removal of the filter cake without the use of a bellows type filter web.

6 Claims, 20 Drawing Figures

FILTER

This is a continuation of application Ser. No. 097,877 filed Nov. 27, 1979 which in turn is a continuation of application Ser. No. 896,437 filed Apr. 14, 1978, now abandoned.

BACKGROUND OF THE INVENTION

The invention relates to a filter which preferably is equipped with vertically disposed hole-like filter webs which are adapted to perform a movement in order to remove the filter cake.

An alluvial or matting filter of this type is known from the West German Pat. No. 1 007 294. The filter means or filter web in this case is formed as a bellows which is extendable in longitudinal direction. The interior of the bellows is supported or stiffened by means or resilient wire coils. If the stiffening elements are not provided the bellows can be pretensioned by means of a tension spring provided in its open bottom portion.

The drawback of this prior art product is that parts are required like coils or tension springs which are subject to mechanical stress and therefore are exposed to a high degree of wear and metal fatigue. The same fatigue phenomena appear also in the bellows themselves. Furthermore, the filtration can be disrupted since, for instance, in case of pressure changes through the mechanical parts forces are generated which may cause a premature fracture or dropping off parts of the filter cake.

It is therefore an object of the present invention to provide a filter which avoids these drawbacks and in particular which does not make use of a bellows to cause movement of the filter web in order to separate the filter cake.

SUMMARY OF THE INVENTION

The object of the invention is met by supporting the filter web by a rigid support body with rounded edges provided in the interior of the filter element. The filter web is then disposed and tensioned over the outside of the filter element.

In its simplest modification the support means on which the hose-like filter web is disposed may be formed of three longitudinal rods which form a kind of cage into which the filtrate flows. The fastening of the rods can be effected by cross struts in the upper and lower part of the element.

However, depending on the kind of filtration and the kind of filtering medium, it is possible also to use more than three rods, preferably five or still more rods, in order to prevent too much of a compression of the filter web during the filtration.

There is also provided a central tube for the filtrate which is open at the top and connects with a collecting tube and which at its lower part which is not secured in any way, but has an opening for the entry of the filtrate and which is otherwise closed across its entire length. This has the advantage as against a perforated tube that the liquid to be filtered can be subjected to complete filtration up to a very minute residue and that there can be liquid evacuated in the lower portion of the device also during the blowing out of the filter cake. This may be important in case of valuable materials. The diameter of the tube should also be relatively small compared with the diameter of the total element so that when air is blown through the filter in the direction of the filtration at high speed, liquid will be entrained with the air which will result in a faster drying procedure. It is also of advantage during the backwash and during removal of the filter cake if the air enters from below and immediately fills the space between the central tube and the filtration medium. By counterpressure or pressure impulses a movement of the web is thus obtained which will result in an easy and complete separation of the filter cake. However, the central tube may also be omitted in certain cases and the exit of the liquid in upwards direction may be effected directly through the element.

Instead of the tube for the filtrate and the rods used as support means it is also possible to employ a compact shaped body of plastic material or enamelled metal which is provided with protrusions and valleys to form a complex profile. The filter web then will rest on three or more and preferably five protusions.

The cross section of the filter element may form a polyhedral shape composed of straight or slightly concave surfaces. The web thus will have a certain movability even though it is tautly placed across the element. This on the other hand would not be possible in case of a circular cross section.

During the filtration the web will be pressed slightly into the valleys or depressions of the compact body. There must, however, still be sufficient intermediate space to permit the percolation of the filtrate. During the removal of the cake, the web is then pressed outwardly in opposite direction. In this case it is also possible to generate a pulsating movement by air impacts.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

PREFERRED EMBODIMENTS

Figure 1:
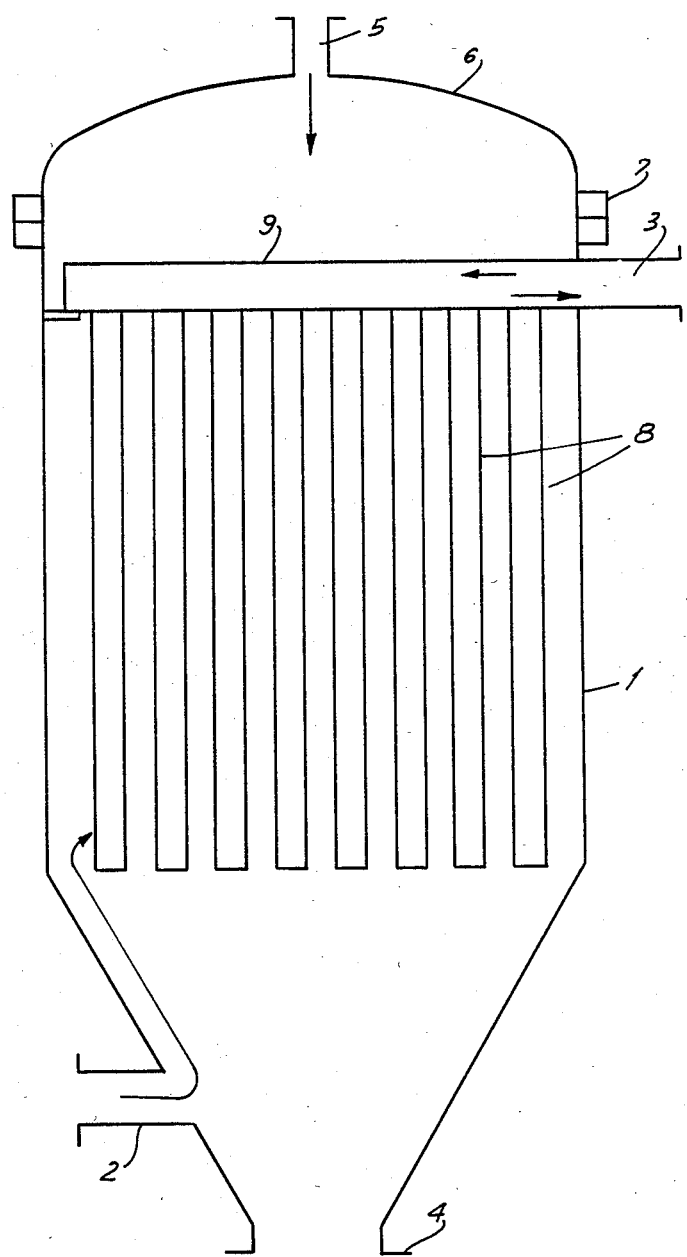
FIG. 1 shows a longitudinal section through a filter vessel which is provided with the filter elements of the invention.

With reference to FIG. 1 it will be seen that the filter vessel 1 is provided with an inlet channel 2 for the suspension to be filtered and an outlet channel 3 for the filtrate. There is also provided a discharge opening 4 for any filtration residues and an opening 5 for aeration of the filter vessel. A removable lid 6 is connected with the filter vessel 1 by means of a flange 7. The filter elements 8 are provided in conventional form with a collector tube 9.

Figure 2:
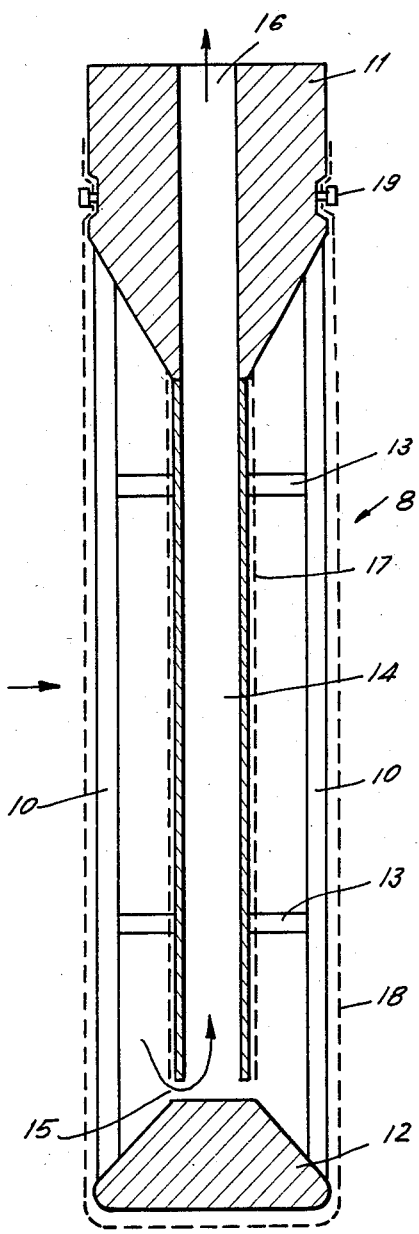
FIG. 2 shows an individual filter element in longitudinal section.

With reference now to FIG. 2 which shows the filter element 8 in greater detail it will be seen that there are provided three or more support rods 10 which are fastened in the top of the filter element by means of a conical body 11. The conical form has the advantage that the web can be secured to the cylindrical part of the cone and no sharp bending will therefore occur by any protruding edges. This will increase the lifespan of the web which is anyway under a substantial stress by the pulsating movement.

In the open lower part the rods are secured for the same reasons to the conical body 12.

It is also possible to provide one or several cross struts 13 depending on the length of the filter element.

In the interior of the element there is provided a central tube 14 which has its lower end ahead of the floor plate 12 but which on the other end passes through the cone 11. The central tube is provided with a lower opening 15 and a top opening 16. Around the central tube a support grating 17 may be provided.

The filter medium proper which is indicated at 18 is pulled across the support rods 10 like a stocking and can be fastened in conventional form in a recess of the cone 11 by means of a tension ring 19.

Figure 3:
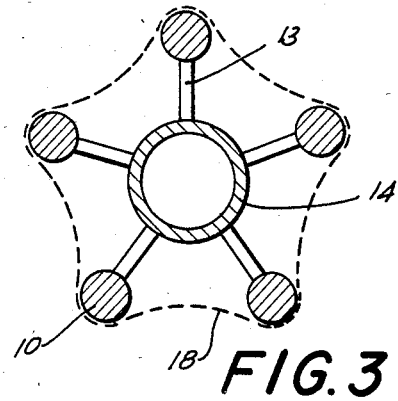
FIG. 3 shows a cross section through a filter element provided with longitudinal rods, the illustration being shown in the condition of filtration.
Figure 4:
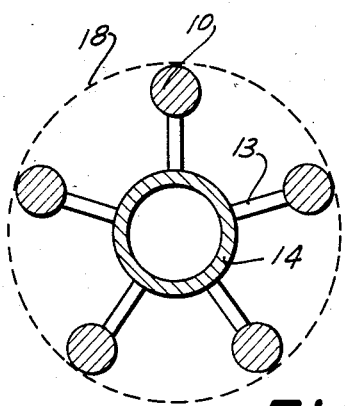
FIG. 4 shows the same filter element during backwash.

With reference to FIGS. 3 and 4 there will be seen a cross section of the filter element which shows five outer supporting rods connected with the central tube by connections 13. This embodiment is shown in FIG. 3 during filtration and in FIG. 4 during the backwash and removal of the filter cake.

Figure 5:
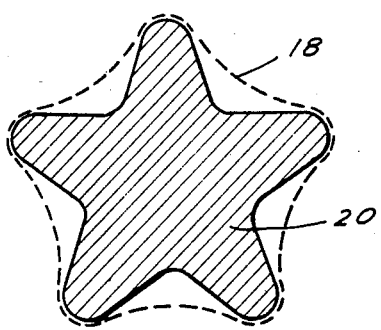
FIG. 5 shows a cross section through a filter element which is provided with a compact complex profile body.

FIG. 5 shows an embodiment where a unitary compact body is used which has a rosette form as indicated for the body 20. The filter web 18 is passed over this body 20.

With reference to FIGS. 6 to 15 it will be noted that all these embodiments show filter elements in the interior of which a packing material 25 is used. This permits to employ weaker and therefore cheaper materials for the permeable base structure. These embodiments have also the advantage of a uniform charge on the filter element caused by the reduction of pressure within the element from bottom towards the top.

Figure 6:
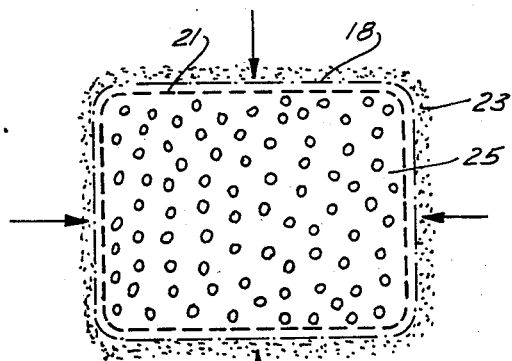
FIG. 6 shows a cross section through a filter element of the invention during filtration.

FIG. 6 illustrates an embodiment where a compact body has a square or otherwise rectangular shape. The permeable base 21 consists of a quadrangular perforated profile. The filtration web 18 is pulled across the exterior of the support body 21. The arrows in FIG. 6 illustrate the flow direction through the filter element. During the filtration period the filtration web is pressed tightly against the perforated body 21 through the liquid pressure. There occurs then a building up of a filter cake 23 outside of the web 18.

Figure 7:
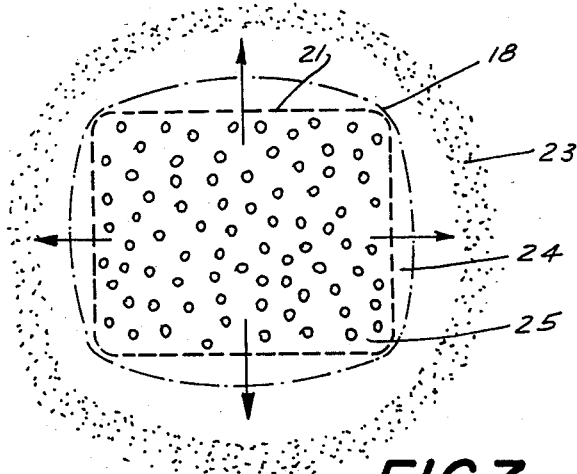
FIG. 7 shows a similar cross section during backwash.

FIG. 7 illustrates the same embodiment during the backwash. Between the perforated base 21 and the web 18 there is here formed a small empty space 24 due to the elasticity of the web. This space is usually sufficient to loosen the filter cake 23 and to remove it from the web 18.

Figure 8:
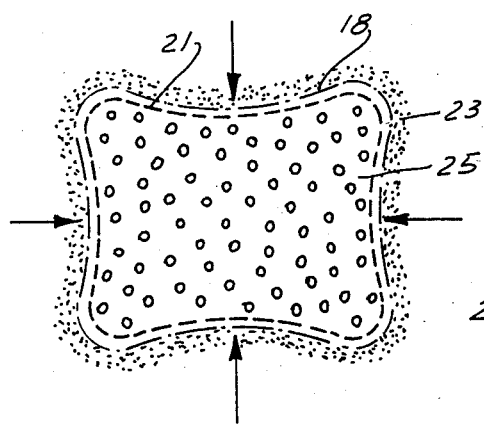
FIG. 8 shows another modification of the filter element during the filtration, this modification being characterized by inwardly curved surfaces.
Figure 9:
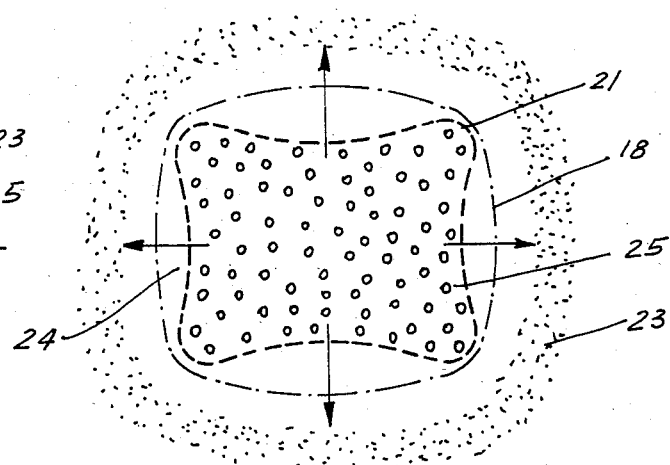
FIG. 9 shows the embodiment of FIG. 8 during backwash.

In cases where heavier webs are used, for instance metal webs or similar, the backwash process can be improved by providing the support body with surfaces which are slightly curved inwardly. This kind of embodiment is shown in FIG. 8. The filter web 18 in this case is pressed against the permeable base 21 during the filtration and this leads to a building up of the filter cake 23. In the backwash phase which is shown in FIG. 9 the web is pressed outwardly, that is the play for the movement of the web is larger in this case than in FIGS. 6 and 7. The filter cake 23 is therefore also subject to a stronger movement and the removal from the web thus is faster and easier. FIG. 9 shows the backwash phase with an inwardly curved perforated support body 21. 18 indicates again the outwardly pressed web 18, while 23 indicates the filter cake in the condition of removal. The comparatively large intermediate space 24 between the web and the support body will be noted.

With metal webs the total movement is rather small and there is therefore no danger of tearing the web.

The use of metal webs is particularly of interest where very high temperatures must be used, for instance in case of filtration of hydrogenated coal during the liquifying of coal.

Figure 10:
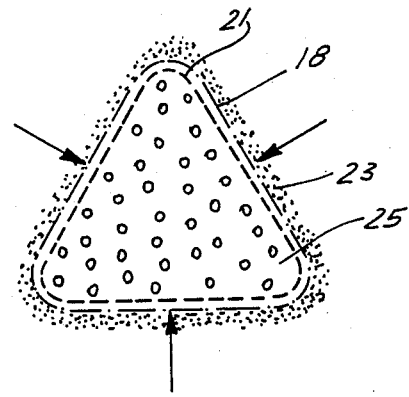
FIG. 10 shows a modification of the filter element with only three filter surfaces in the filtration phase.
Figure 11:
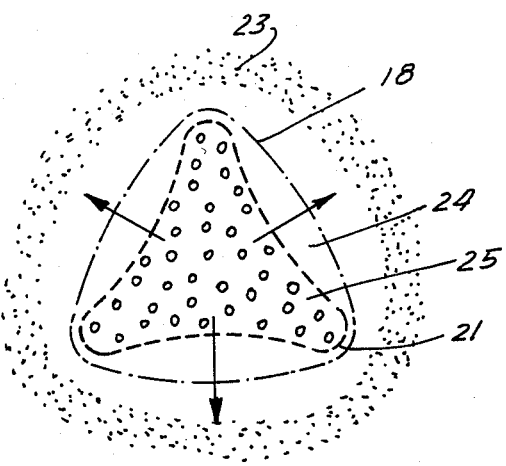
FIG. 11 shows the same embodiment as FIG. 10 during the backwash.

FIGS. 10 and 11 illustrate a filter element of triangular form.

Figure 12:
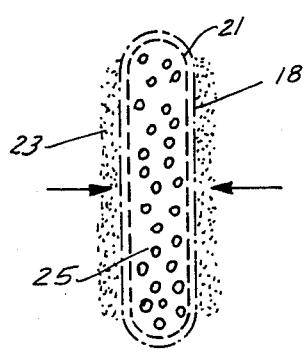
FIG. 12 shows another embodiment of the filter element with a rectangular cross section during the filtration phase.
Figure 13:
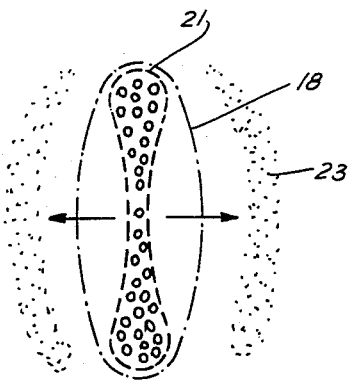
FIG. 13 shows the embodiment of FIG. 12 during backwash.
Figure 14:
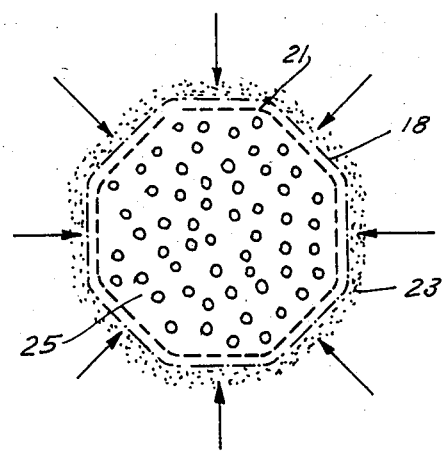
FIG. 14 shows another embodiment of the filter element with an octahedral cross section and flat surfaces during the filtration phase.

FIGS. 12 and 14 illustrate the filter element with rectangular form of the support body.

Figure 15:
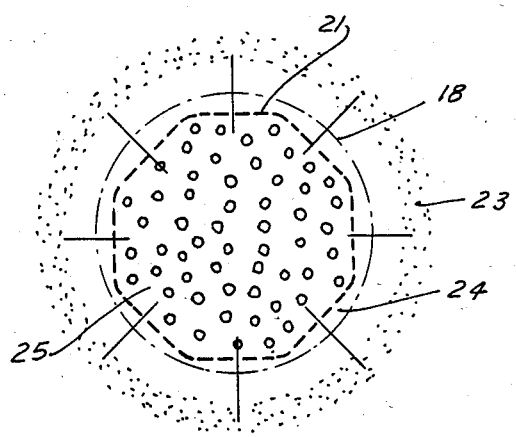
FIG. 15 shows the embodiment of FIG. 14 during backwash.
Figure 16:
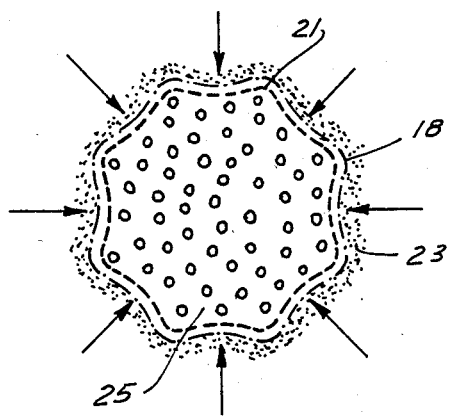
FIG. 16 shows an embodiment of a filter element having a polyhedral cross section and curved filter surfaces.
Figure 17:
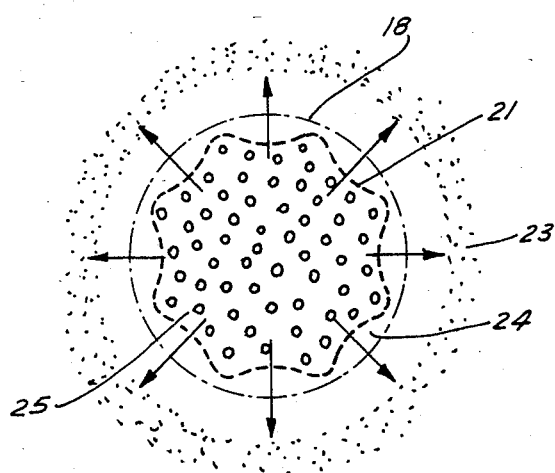
FIG. 17 shows the same embodiment as FIG. 16 during the backwash.

FIGS. 14 to 17 illustrate embodiments with octahedral cross section. FIGS. 14 and 15 show straight outer surfaces, while FIGS. 16 and 17 show inwardly curved surfaces.

In these cases FIGS. 14 and 16 again show the filtration phase, while FIGS. 15 and 17 show the backwash phase.

Figure 18:
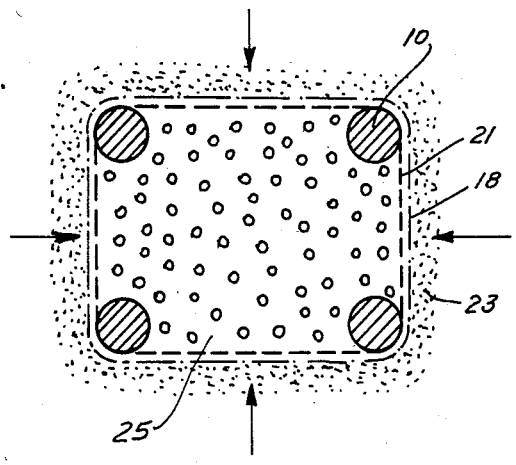
FIG. 18 shows another embodiment of the filter element with inwardly disposed support members during the filtration phase.

FIG. 18 shows an embodiment where the filter element consists only of support rods 10, for instance round rods, while the permeable base 21 consists of a coarse mesh net which is filled with packing material 25. FIG. 18 again shows the filtration phase, while FIG. 19 shows the backwash phase.

Figure 19:
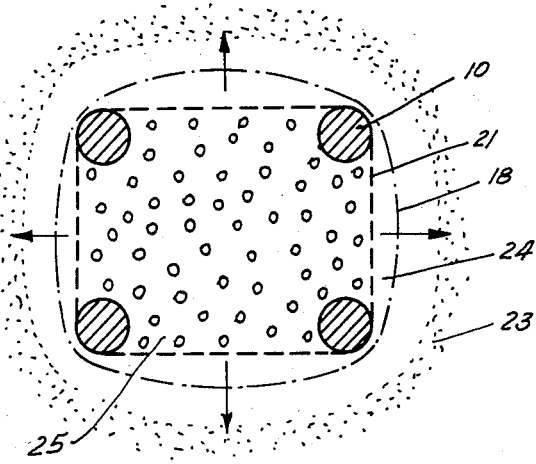
FIG. 19 shows the same embodiment as FIG. 18 during the backwash.
Figure 20:
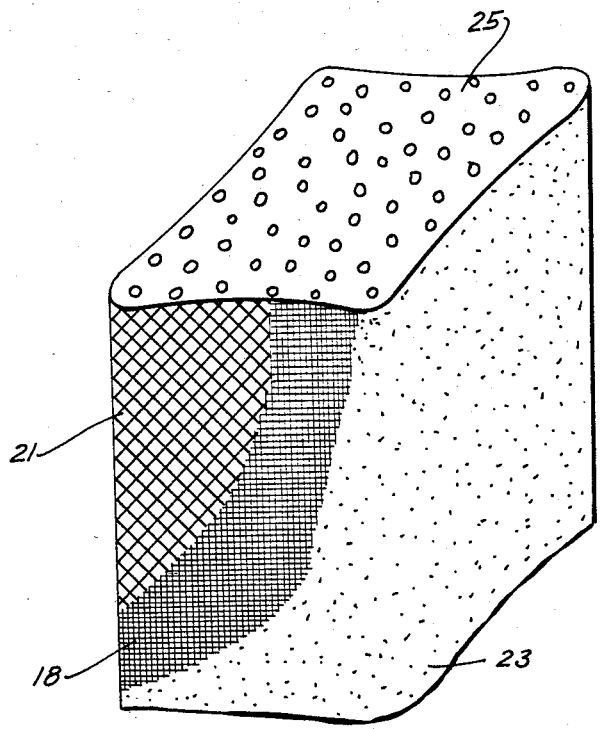
FIG. 20 is an illustration in perspective of a filter element provided with a packing material.

In FIG. 19 the structure of a filter element of the invention which is filled with a packing material 25 is illustrated.

The operation of the filter of the invention is as follows: During the filtration the liquid or suspension to be filtered which additionally may also contain a filter aid enters through the channel 2 into the filter vessel 1. The pressure of the liquid causes the filter web 18 which is supported by the rods 10 to be pressed against the free interior. The solid materials then are deposited on the web and form the filter cake.

After percolation of the liquid through the filter cake the liquid is passed into the opening 15 of the central tube 14 and is caused to rise in the tube until it leaves the element through the upper opening 16 and via the collecting tube 9 and the exit channel 3 of the filter vessel.

After completion of the filtration the filter cake can be dried in direction of the filtration by introduction of gas, for instance through the aeration duct 5.

The removal of the dried filter cake is effected through compressed air or gas in a direction contrary to the filtration direction, for instance by way of the channel 3 and the collector duct 9.

The filter elements can be disposed so that they can be charged with compressed air in individual groups. The impacts of the compressed air cause the filter web to be pressed outwardly and thus to be smoothed out as shown in FIG. 4. This will cause the filter cake to be thrown off.

After removal of the filter cake through the opening 4 in the bottom of the filter vessel for which a closure may be used (not shown) further cleaning of the filter web can be effected by backwash with a cleaning fluid.

For the support bodies, any kind of polyhedrons can be used. The selection of the polyhedrons depends on the size of the filter element and the type of filter web, etc.

Thus the selection of the cross section of the support body depends on the total cross section of the filter element, and on the other hand on the selection of the web. The distance of free movement of the web between the support points should be selected in a manner to obtain a movement as large as possible which, however, must not be of a kind that a permanent deformation occurs.

A particular advantage of the filter of the invention is the rapid and complete removal of the dried filter cake without the use of any movable parts.

Further advantages are obtained by filling the interior of the filter element with packing materials. This will permit a particularly fast and thorough drying of the filter cake by blowing of gas in the direction of filtration. However, during the backwash phase, the packing material would form too great a resistance and the filter cake would be blown off only in the upper part of the device. In this case it is necessary therefore to provide for openings in the support body so that the backwash gas can easily pass between the filter web and the support body and the filter cake can thus be removed across the entire length of the device. For the filtration, as already noted, there may be used fine metal webs. Preferably, in this case there are used metal webs of high mobility similar to band filter webs to avoid an excessive stress on the moving wire meshes.

It is possible to use two layers of filter web, that is, an outer fine meshed web and an inner support mesh of a coarser structure. In this case the outer filter web will move with removal of the cake while the inner coarser support web will retain the inwards directed shape. Because of the easy mobility of the metal webs, the wires thereof will slightly move against each other and thus dried up soiling particles will be loosened and a permanent encrustation will be prevented.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and to be protected by Letters Patent is set forth in the appended claims:

1. A filter for hard substances-containing liquid, particularly an alluvial filter, comprising a pressure vessel, and a plurality of candle-like filter elements accommodated in said vessel and vertically suspended therein, each of said filter elements including a rigid supporting body having a hollow central tube extending along the elongation of said body, said central tube having a top end and a bottom end and being enclosed over the periphery thereof and open only at said top end and said bottom end, a plurality of peripheral rods surrounding said central hollow tube and forming a rounded periphery of said rigid body, and a plurality of transversal reinforcing elements extending between said central hollow tube and said peripheral rods and connecting the latter with the former, and a filter web extending over the periphery of said rigid body and the bottom thereof, so that during the filtration the liquid being filtered flows in a radial direction from the exterior of said filter elements inwardly through said filter web, the filtered liquid then enters said central tube of each filter element through the bottom end, flows in an axial direction within said hollow tube, and then leaves the respective central tube through the top end thereof, whereas during the backwashing the liquid being backwashed enters the respective hollow central tube of each of said filter elements through the top end thereof, flows in the axial direction in said hollow central tube, leaves said hollow central tube through the bottom end thereof and distributes between said hollow central tube and said filter web, and then flows in the radial direction from the interior of each of said filter elements outwardly through said filter web.

2. The filter of claim 1, wherein said transversal elements are spaced along the length of said filter elements.

3. The filter of claim 2, wherein said supporting body further includes means for securing said rods within said filter element, said means being of a substantially conical shape and positioned at the top and the bottom of said filter element.

4. The filter element of claim 3, including fastening means for securing the web to said securing means only at the top of said filter element.

5. The filter element of claim 4, wherein said hollow central tube extends through the securing means positioned only at the top of said filter element.

6. The filter of claim 1, wherein the filter element is filled with a packing material.

* * * * *